United States Patent Office 3,018,555
Patented Jan. 30, 1962

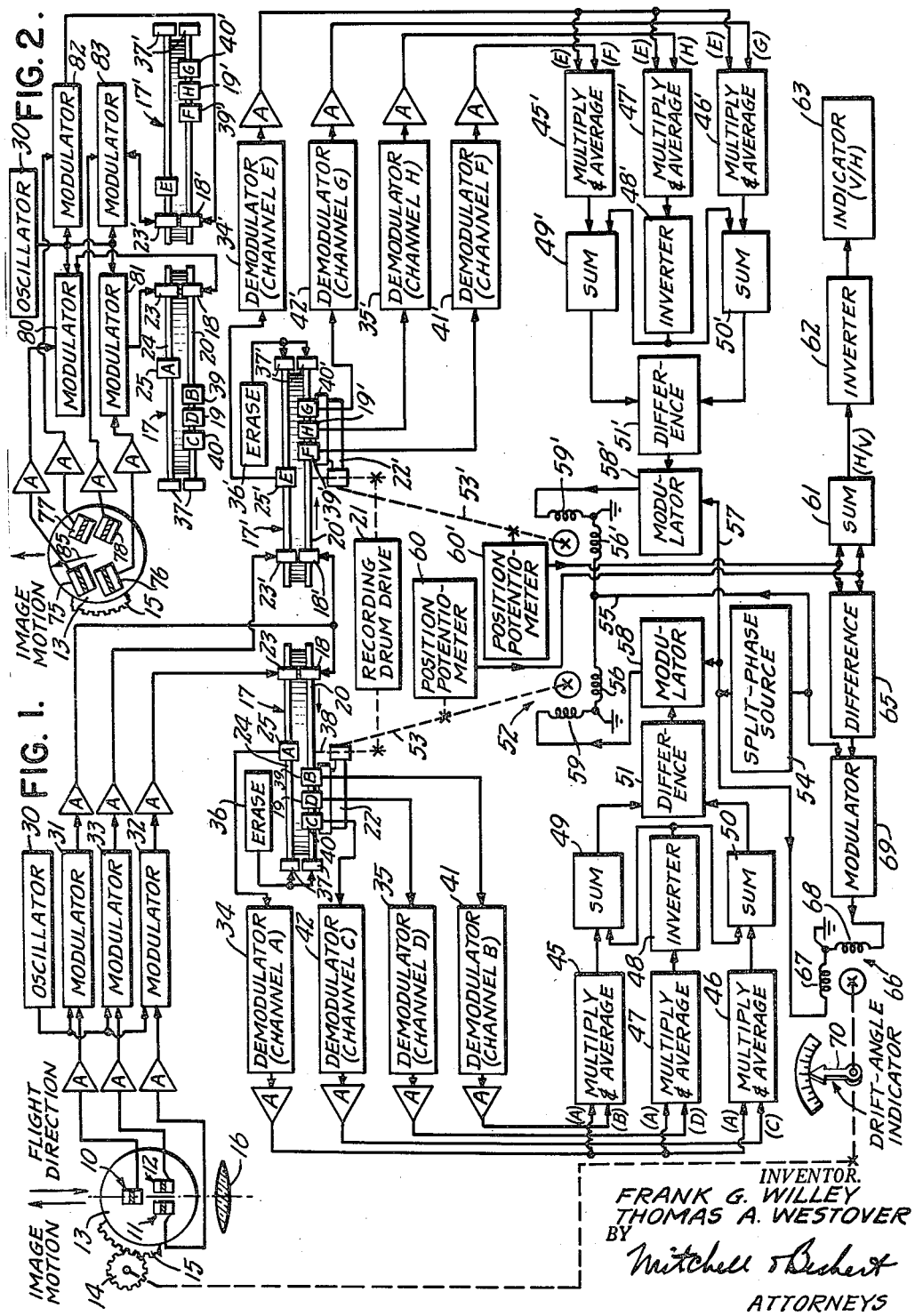

3,018,555
AIRCRAFT VELOCITY-ALTITUDE RATIO METER
Frank G. Willey, Roslyn, and Thomas A. Westover, Hempstead, N.Y., assignors to Servo Corporation of America, New Hyde Park, N.Y., a corporation of New York
Filed Dec. 12, 1956, Ser. No. 627,810
12 Claims. (Cl. 33—46.5)

Our invention relates to optical scanning devices, particularly of the airborne variety, and this application is concerned with automatic means for determining the velocity-altitude function (or $V/H$ rate) of an aircraft.

It is an object of the invention to provide an improved device of the character indicated.

It is another object to provide an improved automatic airborne means for continuously determining the true velocity-altitude function of the aircraft.

It is a further object to meet the above objects with a device which can simultaneously provide a continuous indication of the instantaneous drift angle of the aircraft, that is, an indication of the angle by which the body axis of the aircraft deviates from the instantaneous true flight axis in reference to the ground.

A specific object is to meet the above objects with a completely passive (i.e. non-radiating) device.

Other objects and various further features of novelty and invention will be pointed out or will occur to those skilled in the art from a reading of the following specifications in conjunction with the accompanying drawings. In said drawings, which show, for illustrative purposes only, preferred forms of the invention:

FIG. 1 is a view schematically indicating mechanical and electrical parts of a $V/H$ and drift-angle computer incorporating features of the invention; and FIG. 2 is a view similar to FIG. 1 to illustrate a modification of a part thereof.

Briefly stated, our invention contemplates an airborne scanner and computer for continuously developing the true velocity-altitude function ($V/H$ rate) of the aircraft and with additional provision of continuous indication of the drift angle of the aircraft. For the basic data used in determination of the velocity-altitude function, we employ but two energy-responsive elements, which may be heat-detector cells, such as thermistor bolometers, as employed in scanners of the type discussed in greater detail in copending patent application, Serial No. 320,272, filed November 13, 1952, now patent No. 2,967,211, granted Jan. 3, 1961, in the names of Henry Blackstone and Frank G. Willey. As distinguished from such scanners, however, we rely in the present case primarily only on the motion of the aircraft to perform the scanning function.

Essentially, two cells and associated optical means carried by the aircraft are directed at the ground, preferably directly beneath the aircraft, in such orientation that, due to the motion of the aircraft, the path scanned by one of said elements substantially trails the path scanned by the other of said elements. In this way, there are developed (in each of the respective elements) substantially duplicate video outputs, the essential difference between the two being one of time-delay or time-displacement. The video output of the lead element is subjected to an adjustably variable delay, and polarity-sensitive correlation-computer means continuously evaluates the delayed signal of the lead element, as against the undelayed signal of the trailing element, for maximum correlation; it will be understood that because of reversal in the optical system the "lead" element, although first to scan a given part of the ground, will actually be to the rear of the "trailing" element, in regard to physical location on the aircraft. If the computer senses that maximum correlation is achieved by shortening the delay, then an automatic delay correction is made in that direction, and if the computer senses that maximum correlation is achieved by prolonging the delay, then automatic corrective measures are also taken. The net result is that the correlation-computer means continuously maintains correct adjustably varied delay to achieve maximum correlation. For the case of zero drift angle, that is, when the scan paths of the two cells are aligned with the true flight axis, the measured delay (i.e., adjustment of delay for one of the signals with respect to that of the other) is an inverse function of the $V/H$ rate, and a direct indication thereof may be presented.

In order that the $V/H$ rate computed by the above-described organization shall not be subject to error occasioned by drift angle, we also provide automatic means whereby the pattern of the cells may be adjustably oriented with respect to the longitudinal aircraft body axis; the $V/H$ computation then reflects true $V/H$ rate.

In one form of the invention the above-indicated results are achieved by employing a triangular pattern of three cell elements which view the ground through a single optical system, such that two of the cell elements are closely laterally spaced with respect to the flight axis, and the third element is in longitudinally spaced relation with the first two, but symmetrically between and preferably so as to have a scan path that is in overlapping relation with the scan paths of the first two cells. In the other form of the invention, two separate pairs of cells are employed, there being for each pair a leading and trailing element, the two pairs being preferably laterally spaced. Whichever the form of the invention, two independent delay observations are made on video signals reflecting, on the one hand, leading and trailing elements to the left of the flight axis and, on the other hand, leading and trailing elements to the right of the flight axis, it being understood that for the triangular cell pattern, the third cell serves both sides of the cell pattern. The true $V/H$ rate is obtained by taking the sum of (or averaging) the adjusted delays necessary to achieve correlation in the two independent delay determinations, and the drift-angle correlation is established by observing the difference between the delay adjustments necessary to achieve the two correlations. Any such difference is utilized to correctively orient the pattern of the cells, so as to maintain at all times complete symmetry of this pattern with respect to the true flight axis of the aircraft; thus, the observed instantaneous setting of the means for orienting the pattern provides a direct indication of the instantaneous drift angle of the aircraft.

Referring to FIG. 1 of the drawings, our invention is shown in application to a $V/H$ scanner employing a triangular pattern of three energy-responsive elements 10—11—12, the actual sensitive areas of said elements being shown by cross-hatched patterns; the present symbolism will be recognized as that conventionally employed for infrared-responsive detectors known as thermistor bolometers. All cell elements 10—11—12 are shown mounted on a suitable platform 13 which, for convenience, will be assumed to be generally in a horizontal plane, and which for purposes of the invention is mounted for rotation about a central vertical axis, as driven by a pinion 14 engaging an annular or ring gear 15 on platform 13.

To cause the cell pattern shown for elements 10—11—12 to scan the ground, due to motion of the aircraft, we employ optical means, such as an infrared-transmitting lens 16, as of arsenic-trisulfide glass, said lens being preferably on the vertical axis of rotation of the support or platform 13. The employment of a lens such as the lens 16 has the effect of reversing the cell pattern, when considered from the viewpoint of scanning the ground; thus, image motion and flight direction are shown by arrow legends to be in opposite directions. Whatever the actual orientation of the scan pattern on the ground, it will suffice, for present purposes, to say that the element 10 is the leading element, that is, it is first exposed to a given radiation traversed by the aircraft in its flight; and the elements 11—12 are trailing elements spaced closely laterally with respect to the flight axis and trailing the element 10, in such manner that preferably the path scanned by the leading element 10 substantially overlaps with the paths scanned by both trailing elements 11—12 (when symmetrically oriented with the true flight direction, in reference to the ground).

As indicated generally above, the $V/H$ rate is determinable by ascertaining the time delay between closely similar video signals, produced respectively by the element 10 and by one of the trailing elements 11 or 12. In the form shown, the delay evaluation is made by means of a continuously recycling storage device, such as a magnetic drum 17, with recording and pick-up heads 18—19 on a first channel 20, and by employing correlator means (to be described) for automatically correctively setting the effective delay between recording at 18 and pick-up at 19, said corrected delay being that which necessarily must be applied to the video output of the lead cell 10 in order to achieve maximum correlation with the video output of the trailing cell 11. Adjustment may be made by adjustably controlling the speed of rotation of the drum 17; but, in the form shown, the drum drive 21 runs at constant speed, and an adjustably displaceable arm 22 supports and shifts the pick-up element 19, to produce the delay necessary for maximum correlation.

As a matter of convenience in signal processing, that is, in order that the correlation computer may evaluate completely analogous signals reflecting the delayed video output of cell 10 and the undelayed video output of cell 11, we subject both video signals to similar processing and therefore we record "undelayed" video output of cell 11, at 23 on the second channel 24 of the recorder or delay means 17. The pick-up head 25 for the "undelayed" video signal is a fixed element, and therefore the "undelayed" video signal is in reality a fixedly delayed video signal. It will thus be understood throughout this specification that the use of the terms "delayed" and "undelayed" in reference to the video outputs of the various cell elements are purely relative terms, and that it is in reality only the adjusted difference in delay which matters in order to achieve correlation.

In the form shown, we apply video signals to the storage device 17 as modulations of a carrier frequency best suited to the recording speed and technique employed. For example, for a magnetic-recording channel speed of 5 to 10 inches per second at 20—24, it is convenient that the carrier frequency be of the order of 1500 cycles. Such frequency may be supplied by a suitable oscillator 30 to each of three modulators 31—32—33, respectively serving the cells 10—11—12. Amplifiers, as necessary, are shown by conventional symbols. Thus, the signal recorded on the "undelayed" channel 24 will be the carrier frequency, modulated at 32 by the video output of the trailing cell element 11 on the left side of the pattern; and the signal recorded at 20 on the "delayed" channel will be the same carrier frequency, modulated at 31 with the video output of the lead cell 10. The continuous video-modulated signals on these channels are continuously picked up at 25—19 and fed to demodulators 34—35. Continuously recycling operation is assured by employing erasing means 36, to supply a biasing signal to suitable heads 37 on each of the channels 24—20.

In accordance with the invention and as indicated generaly above, the delay introduced at 17 for the lead video signal relatively to the trailing video signal is adjustably varied in accordance with evaluated maximum correlation between the two signals, present in the outputs of the demodulators 34—35. If the support arm 22 for the adjustable pick-up head 19 were continuously angularly oscillated about the drum axis 38, and if the amplitude of oscillation were such as to cause the adjusted delay to intermittently probe on opposite sides of the delay at which maximum correlation is achieved, then it would be possible for the single pick-up head 19 to determine the sense or direction in which delay adjustment should be made in order to achieve maximum correlation with the "undelayed" signal developed at 25. However, in the form shown, we employ the pick-up head 19 as the central or intermediate one of three heads, all carried by the support arm 22; the inner end pick-up head 39 samples delays shorter than those producing maximum correlation, and the outer-end head 40 samples delays greater than those achieving maximum correlation. The pick-ups 19—39—40 are all independently connected to separate demodulators 35—41—42.

For convenience in identification in the discussion which follows, the outputs of the respective pick-ups are identified by lettered channel designations. Channel A supplies the "undelayed" video, developed at the output of demodulator 34. Channel D supplies the optimized "delayed" video signal, developed at the output of demodulator 35, and representing the "delayed" video signal having maximum correlation with the "undelayed" video signal. Channel B supplies the foreshortened "delayed" video signal, developed at the output of demodulator 41; and channel C supplies the excessively "delayed" video signal, developed at the output of demodulator 42.

In the form shown, similar correlation functions are performed on three different pairs of video signals in separate circuits 45—46—47: circuit 45 concerns itself with the correlation between the video outputs of channels A and B; circuit 46 concerns itself with the correlation between the video outputs of channels A and C; and circuit 47 concerns itself with correlation between the video outputs of channels A and D. To obtain polarized sensing signals reflecting the direction in which arm 22 should be positioned to achieve maximum correlation for the output of pick-up 19 (channel D) with that of channel A, the outputs of correlation circuits 45—47 are differentially compared in a first operation, and the outputs of circuits 46—47 are differentially compared in a second operation. For this purpose, an inverter 48 is shown connected to the output of the central (or "maximum") correlation circuit 47, and the inverted output in turn separately feeds a first summation circuit 49 and a second summation circuit 50, each respectively supplied by the outputs of circuits 45—46. A difference circuit 51 continuously evaluates the outputs of 49—50 for magnitude and sense of difference, and this polarized differential is used for the automatic corrective placement of the pick-up arm 22 about drum axis 38.

In the form shown, the means for positioning the arm 22 is shown schematically to include a two-phase motor 52 mechanically connected, as suggested by the dashed line 53, in driving relation with the arm 22. A split-phase source 54 develops a first output phase in line 55 for exciting a reference-phase winding 56 of motor 52. The other output phase (90° displaced from the first output phase) of source 54 is supplied in line 57 to a modulator 58, and this secoond output phase is modulated by the output of the difference circuit 51.

Under the circumstances, it will be clear that if the summation at 49 should exceed (in magnitude) the summation at 50 (meaning that maximum correlation is achievable for a delay shorter than that for which the pick-up 19 has been set), then the motor 52 will be directionally driven so as to correctively position the arm 22 until the summations at 49—50 are equal; at such time, zero signal will be applied to the second motor winding 59, and the position of pick-up head 19 will be retained to develop maximum correlation. Of course, the opposite direction of corrective placement of head 19 will be called for and effected, should the summation at 50 exceed that at 49.

As indicated generally above, the corrected delay introduced into the second channel 20 by reason of motor operation at 52 represents, at maximum correlation, the instantaneous velocity-altitude function of the aircraft. Actually, the more the delay, the lower the $V/H$ rate, so that displacement of shaft 53 is really an inverse function of $V/H$ rate. However, the equipment thus far described is not necessarily capable of yielding true $V/H$ information. For example, cross-wind, slide slip, and other factors cause the aircraft-body axis to deviate from the true flight axis in reference to the ground, so that the mere displacement of shaft 53 may represent a $V/H$ rate which involves a drift-angle error.

To correct for this drift-angle error, we have in the form shown provided in effect a duplicate adjustably variable delay means 17' involving automatic probing for maximum correlation, for the case of the video output of cell 12 in comparison with that of the cell 10; the storage and correlation functions achieved with this duplicate equipment thus serve the cell pattern on the right-hand side of the flight axis, in a manner completely analogous to that in which the already described parts serve the left-hand side of the flight axis. For this reason, corresponding parts serving the right-hand side have been given the same reference numerals as those used on the left-hand side, but with primed notation; also, in order to permit clear identification of the channels used for the various correlation operations, the legends E, F, G and H have been adopted to correspond with those used for channels A, B, C and D, respectively, for the left-hand side. Thus, when the pick-up support arm 22' has been adjustably positioned for development of maximum correlation between demodulated video signals for channels E and H, the position of shaft 53' will provide another indication of the instantaneous $V/H$ rate.

Actually, in the presence of drift, the $V/H$ rate represented by position of shaft 53 will be greater or less than the true $V/H$ rate, while the $V/H$ rate represented by the position of shaft 53' will be less or greater than the true $V/H$ rate; thus, true $V/H$ rate is developed by summing the two shaft positions or by taking the average thereof. In the form shown, position potentiometers 60—60' sample the positions of the shafts 53—53' and supply the same to a summation circuit 61. As indicated above, the output of circuit 61 inversely reflects the $V/H$ rate and is therefore proportional to $H/V$, so that upon inversion at 62, the output signal reflecting the true $V/H$ rate is obtained; we have shown indicating means 63 for response to and indication of the true $V/H$ rate.

Inherent in the derivation of the two shaft-position signals at potentiometers 60—60' is the ability to discriminate for the orientation error necessary to achieve drift-angle correction. In accordance with a feature of our invention, we continuously probe for drift-angle correction by operating a null-finding mechanism in response to the comparative outputs of potentiometers 60—60'. Thus, we show the two potentiometers 60—60' feeding a difference circuit 65 which will yield a signal of magnitude and polarity reflecting the extent to which the signal from potentiometer 60 predominates over or is less than that from potentiometer 60'. Drift-angle correction is achieved by adjustably orienting the cell pattern of cells 10—11—12 until the null position is reached, that is, until the shaft (delay) position at 53 equals that at 53'. In the form shown, a split-phase motor 66 is in driving relation with the pinion 14. The reference winding 67 of motor 66 is supplied by one of the output phases of source 54, and the control winding 68 thereof is supplied by the other output phase, as modulated at 69 by the output of the difference circuit 65. Upon achieving the null position, the video-signal delays (as between those of elements 10—11 and those of elements 10—12) will be the same, meaning that the cell pattern of cells 11—12 is symmetrically oriented with respect to the true flight path in relation to the ground. This pre-supposes a given orientation of the platform 13 about its axis in reference to the aircraft body axis and, therefore, simple indicator means, including an arm or pointer 70 on the shaft of motor 66, may be direct-reading in terms of drift angle.

In the modification shown in FIG. 2, we employ essentially the same delay and correlation techniques as those described for FIG. 1 and, therefore where applicable, the same reference numerals are used. The essential difference between the two arrangements is the employment of a pattern of four cells 75—76—77—78 in FIG. 2, as distinguished from the pattern of three shown in FIG. 1. The sensitive areas of the cells in FIG. 2 are shown to be elongated and relatively narrow and to be set at a bias angle symmetrically with respect to the image-motion axis. The leading and trailing cells 75—76 on the left side of the image-motion axis are caused to scan overlapping paths, and the same may be said for the leading and trailing cells 77—78 on the right-hand side of the image-motion axis; however, both cells 75—76 are inclined in a first direction and both cells 77—78 are inclined in the opposite direction and preferably to the same extent, all with reference to the image-motion axis.

Because of the added cell in FIG. 2, it is necessary to employ four modulators 80—81—82—83 in place of the three described for FIG. 1, so that the left-hand set of cells 75—76 serves the drum 17, and the right-hand set of cells 77—78 serves the drum 17'. The operation is otherwise the same as described for FIG. 1. Thus, the shaft-position development at 53 reflects correlation between the video outputs of cells 75—76, and the shaft position at 53' reflects correlation between the video outputs of cells 77—78. Cell-pattern orientation is achieved by driving the ring gear 15 by the mechanism described in FIG. 1, in accordance with the instantaneous difference in shaft positions at 53—53'.

The cell-pattern arrangement of FIG. 2 can in certain situations develop a desirable response, in that, no matter what the drift angle, stronger signals for correlation will be developed by one or the other of the cell pairs 75—76 or 77—78, whichever pair happens to more directly scan the instantaneous true flight axis. Thus, for the situation in which the positioning of support 13 is such that the image motion in relation to the cells is, say, in the direction indicated by the arrow 85 (meaning that platform 13 should be shifted counterclockwise to correct for drift angle), the sensitive areas of cells 75—76 will more directly face the vector 85 than will the sensitive areas of cells 77—78, so that stronger video signals are likely to be developed in the outputs of cells 75—76 than in the outputs of cells 77—78. These stronger output signals improve the ability of the system to discriminate as to the direction for corrective movement of shafts 53—53' so that the null-finding operation (whereby drift angle is corrected) is a fast and reliable operation.

It will be seen that we have described an improved velocity-altitude computer which may be completely automatic in its functioning and which may be independent of the instantaneous drift heading of the aircraft, permitting development of true $V/H$ rate and also of true drift angle. Necessarily, the operation of the device presumes a relatively stable aircraft or a relatively stable platform on the aircraft. Such stabilized platforms are well known and therefore have been deemed unnecessary to the present disclosure, although it is preferred that the cell platform 13, including the optics 16, be carried by such a stabilized platform.

Generally speaking, as between the two alternative cell configurations of FIGS. 1 and 2, that of FIG. 1 is to be preferred, in that with FIG. 1 the degree of correlation (between the outputs of elements 10—11 on the one hand and between the outputs of elements 10—12 on the other hand) is more markedly a function of uncorrected drift angle than is the case for FIG. 2. This means that the system of FIG. 1 is more sensitive to drift-angle errors (i.e. uncorrected drift angle) so that it may more reliably maintain a properly tracked, continuously corrected drift-angle setting at 14—15, with attendant more reliable derivation of $V/H$ data.

While we have described the invention in detail for the preferred forms shown, it will be understood that modifications may be made within the scope of the invention as defined in the claims which follow.

We claim:

1. An aircraft velocity-altitude ratio meter, comprising two energy-responsive elements spaced generally in the aircraft-flight direction, optical means for imaging the ground on said elements such that, due to the motion of the aircraft, the image received by one element substantially trails the image received by the other element, whereby the video output of said one element trails that of the other element with a delay representative of the instantaneous image velocity at said elements, and said instantaneous image velocity is related to instantaneous aircraft velocity inversely as the instantaneous aircraft altitude, adjustably variable delay means accepting the video output of said other element to the exclusion of the video output of said one element, polarity-sensitive correlation-computer means responsive simultaneously to the output of said delay means and to the output of said other element and developing a signal reflecting the sene of incremental corrective delay necessary to achieve correlation, and means responsive to said last-defined means and in adjustably controlling relation with said delay means, whereby upon adjustment of said delay means to achieve maximum correlation, the delay represented by said adjustment may reflect said image velocity at said elements and therefore the velocity-altitude function of the aircraft.

2. An aircraft velocity-altitude ratio meter, comprising two energy-responsive elements spaced generally in the aircraft-flight direction, optical means for imaging the ground on said elements such that, due to the motion of the aircraft, the image received by one element substantially trails the image received by the other element, whereby the video output of said one element trails that of the other element with a delay representative of the instantaneous image velocity at said elements, and said instantaneous image velocity is related to instantaneous aircraft velocity inversely as the instantaneous aircraft altitude, adjustably variable delay means accepting the video output of said other element to the exclusion of the video output of said one element, polarity-sensitive correlation-computer means responsive simultaneously to the ouput of said delay means and to the output of said other element and developing a signal reflecting the sense of incremental corrective delay necessary to achieve correlation, and means responsive to said last-defined means and in adjustably controlling relation with said delay means, whereby the magnitude of delay adjustment is an inverse function of the instantaneous velocity-altitude function of the aircraft, means for electrically sensing the total effective delay at said delay means for the output of said other element with respect to that of the one at correlation, and inverter means responsive to the output of said last-defined means, whereby said inverter means may yield an electric signal directly indicative of the velocity-altitude function of the aircraft.

3. An aircraft velocity-altitude ratio meter, comprising two energy-responsive elements spaced generally in the aircraft-flight direction, optical means for imaging the ground on said elements such that, due to the motion of the aircraft, the image received by one element substantially trails the image received by the other element, whereby the video output of said one element trails that of the other element with a delay representative of the instantaneous image velocity at said elements, and said instantaneous image velocity is related to instantaneous aircraft velocity inversely as the instantaneous aircraft altitude, a continuously running magnetic-storage device comprising two channels, means for impressing a signal reflecting the output of one of said elements on one of said channels and for impressing a signal reflecting the output of the other of said elements on the other of said channels, a fixed pickup device for one of said channels, and an adjustably positionable head supporting three spaced pick-up devices for the other of said channels, a first correlation computer responsive to the output of said first pick-up and to the output of an end pick-up on said head, a second correlation computer responsive to the output of said first pick-up and to the output of the intermediate pick-up on said head, and a third correlation computer responsive to the output of said first pick-up and to the ouput of the other end pick-up on said head, a first difference circuit continuously responsive to the difference between ouputs of said first and second correlation computers, a second difference circuit continuously responsive to the difference between outputs of said second and third correlation computers, and phase-sensitive positioning means for said head and responsive to the instantaneous predominance in magnitude of output of said first difference circuit with respect to that of said second difference circuit.

4. An aircraft velocity-altitude ratio meter, comprising two energy-responsive elements spaced generally in the aircraft-flight direction, optical means for imaging the ground on said elements such that, due to the motion of the aircraft, the image received by one element substantially trails the image received by the other element, whereby the video output of said one element trails that of the other element with a delay representative of the instantaneous image velocity at said elements, and said instantaneous image velocity is related to instantaneous aircraft velocity inversely as the instantaneous aircraft altitude, means comprising a continuously recycling magnetic-storage device, including a recording head and a pick-up head and means for adjustably positioning one with respect to the other, whereby adjustably varied delay is achieved, means for applying the video output of said one element to said recording head and including a modulator and a carrier frequency source for said modulator, the frequency of said carrier being related to the frequency response of said recording means, demodulator means connected to the output of said pick-up head, polarity-sensitive correlation computer means responsive to the output of said demodulator and responsive to the output of said other detector element and developing a signal reflecting the sense of incremental corrective delay necessary to achieve correlation, and position-control means for adjustably setting said heads with respect to each other in accordance with the output signal of said last-defined means.

5. An automatic airborne velocity-altitude ratio computer, comprising two radiant energy-responsive elements spaced generally laterally from each other and a third such element spaced from said two elements generally in the aircraft-flight direction, optical means for imaging the ground on said elements such that, due to the motion of the aircraft, the path of the image received by said third element substantially overlaps the paths of the respective images received by said first two elements, whereby as between the video outputs of said third element and one of said first two elements on the one hand, and as between the video outputs of said third element and of the second of said first two elements on the other hand, there will be a delay difference reflecting the extent to which said elements fail to be symmetrically disposed with respect to the true path of movement of the aircraft with respect to the ground, so that when this delay difference is zero the orientation of the three elements is symmetrical with the true flight path in reference to the ground, first and second separate correlation computer means coupled to said third element and the first of said two elements and to said third element and the second of said two elements, respectively, for determining on the one hand the delay between video signals of said third element and of the first of said two elements and on the other hand the delay between video outputs of said third element and of the second of said first two elements, differential means coupled to said first and second separate means for evaluating the difference between the outputs of said first and second separate means, and position-control means coupled to said differential means for correctively orienting the images received at said elements with respect to the flight axis in accordance with the observed difference evaluted by said last-defined means.

6. An automatic airborne velocity-altitude ratio computer, comprising a first two radiant energy-responsive elements spaced generally in the aircraft-flight direction and a second two radiant energy-responsive elements spaced generally in the aircraft-flight direction, said first two elements and said second two elements being spaced generally laterally from each other and symmetrically disposed with respect to the aircraft-flight direction, optical means for imaging the ground on said elements such that, due to the motion of the aircraft, the paths of the images received by said first two elements substantially overlap and the paths of the images received by said second two elements substantially overlap, whereby as between the video outputs of said first two elements on the one hand and the video outputs of said other two elements on the other hand, there will be a delay difference reflecting the extent to which said elements fail to be disposed symmetrically with respect to the true path of movement of the aircraft with respect to the ground, so that when this delay-difference is zero the orientation of said elements is symmetrical with the true flight path in reference to the ground, first and second separate correlation computer means coupled to said first two of said elements and to said other two of said elements, respectively, for determining on the one hand the delay between video output signals of said first two elements and on the other hand the delay between video output signals of said other two elements, differential means coupled to said first and second separate means for evaluating the difference between the outputs of said first and second separate means, and position-control means coupled to said differential means for correctively orienting said elements with respect to the flight axis in accordance with the observed difference evaluated by said last-defined means.

7. An automatic airborne velocity-altitude ratio computer, comprising two radiant energy-responsive elements spaced generally laterally from each other and a third such element spaced from said two elements generally in the aircraft-flight direction, optical means for imaging the ground on said elements such that, due to the motion of the aircraft, the path of the image received by said third element substantially overlaps the paths of the respective images received by said first two elements, whereby as between the video outputs of said third element and one of said first two elements on the one hand, and as between the video outputs of said third element and of the second of said first two elements on the other hand, there will be a delay difference reflecting the extent to which said elements fail to be symmetrically disposed with respect to the true path of movement of the aircraft with respect to the ground, so that when this delay difference is zero the orientation of the three elements is symmetrical with the true flight path in reference to the ground, first and second separate correlation-computer means coupled to said third element and the first of said two elements and to said third element and the second of said two elements, respectively, for determining on the one hand the delay between video signals of said third element and of the first of said two elements and on the other hand the delay between video outputs of said third element and of the second of said first two elements, means coupled to said first and second separate means for averaging the delays, and velocity-altitude ratio indicator means including means responsive to the average of delays determined by said averaging means.

8. An automatic airborne velocity-altitude ratio computer, comprising a first two radiant energy-responsive elements spaced generally in the aircraft-flight direction and a second two radiant energy-responsive elements spaced generally in the aircraft-flight direction, said first two elements and said second two elements being spaced generally laterally from each other and symmetrically disposed with respect to the aircraft-flight direction, optical means for imaging the ground on said elements such that, due to the motion of the aircraft, the paths of the images received by said first two elements substantially overlap and the paths of the images received by said second two elements substantially overlap, whereby as between the video outputs of said first two elements on the one hand and the video outputs of said other two elements on the other hand, there will be a delay difference reflecting the extent to which said elements fail to be disposed symmetrically with respect to the true path of movement of the aircraft with respect to the ground, so that when this delay-difference is zero the orientation of said elements is symmetrical with the true flight path in reference to the ground, first and second separate correlation-computer means coupled to said first two of said elements and to said other two of said elements, respectively, for determining on the one hand the delay between video output signals of said first two elements and on the other hand the delay between video output signals of said second two elements, means coupled to said first and second separate means for averaging the delays, and velocity-altitude ratio indicator means including means responsive to the average of delays determined by said averaging means.

9. An automatic airborne velocity-altitude ratio computer, comprising two radiant energy-responsive elements spaced generally laterally from each other and a third such element spaced from said two elements generally in the aircraft-flight direction, optical means for imaging the ground on said elements such that, due to the motion of the aircraft, the path of the image received by said third element substantially overlaps the paths of the respective images received by said first two elements, whereby as between the video outputs of said third element and one of said first two elements on the one hand, and the video outputs of said third element and of the second of said first two elements on the other hand, there will be a delay difference reflecting the extent to which said elements fail to be symmertically disposed with respect to the true path of movement of the aircraft with respect to the ground, so that when this delay difference is zero the orientation of the three elements is symmetrical with the true flight path in reference to the ground, first and second separate correlation-computer means coupled to said third element and the first of said two elements and to said third element and the second of said two elements, respectively, for determining on the one hand the delay between video signals of said third element and of the first of said two elements and on the other hand the delay between video outputs of said third element and of the second of said first two elements, subtracting means coupled to said first and second separate means for determining the difference between the delays, and drift-angle indicator means including means responsive to the difference between delays determined by said subtracting means.

10. An automatic airborne velocity-altitude ratio computer, comprising a first two radiant energy-responsive elements spaced generally in the aircraft-flight direction and a second two radiant energy-responsive elements spaced generally in the aircraft-flight direction, said first two elements and said second two elements being spaced generally laterally from each other and symmetrically disposed with respect to the aircraft-flight direction, optical means for imaging the ground on said elements such that, due to the motion of the aircraft, the paths of the images received by said first two elements substantially overlap and the paths of the images received by said second two elements substantially overlap, whereby as between the video outputs of said first two elements on the one hand and the video outputs of said other two elements on the other hand, there will be a delay difference reflecting the extent to which said elements fail to be disposed symmetrically with respect to the true path of movement of the aircraft with respect to the ground, so that when this delay-difference is zero the orientation of said elements is symmetrical with the true flight path in reference to the ground, first and second separate correlation-computer means coupled to said first two of said elements and to the other two of said elements, respectively, for determining on the one hand the delay between video output signals of said first two elements and on the other hand the delay between video output signals of said other two elements, subtracting means coupled to said first and second separate means for determining the difference between the delays, and drift-angle indicator means including means responsive to the difference between delays determined by said subtracting means.

11. An automatic air-borne velocity-altitude ratio computer, comprising two radiant energy-responsive elements spaced generally laterally from each other and a third such element spaced from said two elements generally in the aircraft-flight direction, optical means for imaging the ground on said elements such that, due to the motion of the aircraft, the path of the image received by said third element substantially overlaps the paths of the respective images received by said first two elements, whereby as between the video outputs of said third element and one of said first two elements on the one hand, and as between the video outputs of said third element and of the second of said first two elements on the other hand, there will be a difference in the degree of correlation reflecting the extent to which said elements fail to be disposed symmetrically with the true path of movement of the aircraft with respect to ground; whereby, when the correlation between the output of said third element and the output of one of said first two elements is the same as the correlation between the output of said third element and the output of the other of said first two elements, the orientation of said received images is symmetrical with the true flight path in reference to the ground; first and second separate correlation-computer means coupled to said third element and the first of said two elements and to said third element and the second of said two elements, respectively, for determining on the one hand the degree of correlation between video signals of said third element and of the first of said two elements and on the other hand the degree of correlation between video outputs of said third element and of the second of said first two elements, polarity-sensitive means coupled to said first and second separate means for evaluating the difference between the outputs of said first and second separate means, and position-control means coupled to said polarity-sensitive means for correctively orienting said elements in accordance with the observed difference evaluated by said last-defined means.

12. An automatic air-borne velocity-altitude ratio computer, comprising two radiant energy-responsive elements spaced generally laterally from each other and a third such element spaced from said two elements generally in the aircraft-flight direction, optical means for imaging the ground on said elements such that, due to the motion of the aircraft, the path of the image received by said third element substantially overlaps the paths of the respective images received by said first two elements, whereby as between the video outputs of said third element and one of said first two elements on the one hand, and the video outputs of said third element and of the second of said first two elements on the other hand, there will be a difference in the degree of correlation reflecting the extent to which the pattern of said elements fails to align itself symmetrically with the true path of movement of the aircraft with respect to ground; whereby, when the correlation between said third element and of one of said first two elements is the same as the correlation between said third element and the other of said first two elements, the orientation of said elements is symmetrical with the true flight path in reference to the ground; first and second separate correlation-computer means coupled to said third element and the first of said two elements and to said third element and the second of said two elements, respectively, for determining on the one hand the degree of correlation between video signals of said third element and of the first of said two elements and on the other hand the degree of correlation between video outputs of said third element and of the second of said first two elements, polarity-sensitive means coupled to said first and second separate means for evaluating the difference between the outputs of said first and second separate means, and velocity-altitude ratio indicator means including means responsive to said difference between the outputs of said first and second separate means.

References Cited in the file of this patent

UNITED STATES PATENTS

| | | |
|---|---|---|
| 2,166,991 | Guanella | July 25, 1939 |
| 2,392,873 | Zahl | Jan. 15, 1946 |
| 2,413,349 | Hancock | Dec. 31, 1946 |
| 2,772,479 | Doyle | Dec. 4, 1956 |
| 2,882,783 | Blackstone | Apr. 21, 1959 |